United States Patent [19]

Chang

[11] Patent Number: 5,647,817
[45] Date of Patent: Jul. 15, 1997

[54] TWO DIRECTIONAL MULTI-SPEED SHIFTING GEAR OF MIDDLE AXLE

[75] Inventor: Dianlin Chang, Shenyang, China

[73] Assignee: Steven Siuwai Lam, Hong Kong, Hong Kong

[21] Appl. No.: 548,735

[22] Filed: Oct. 26, 1995

[30] Foreign Application Priority Data

Nov. 23, 1994 [CN] China .................. 94112633.1

[51] Int. Cl.⁶ .................................................. F16H 3/44
[52] U.S. Cl. ...................... 475/294; 475/297; 475/326; 475/324
[58] Field of Search ................................ 475/294, 297, 475/323, 324, 326; 74/810

[56] References Cited

U.S. PATENT DOCUMENTS

| | | | |
|---|---|---|---|
| 523,246 | 7/1894 | Stebbins | 475/326 X |
| 1,998,376 | 4/1935 | Lundvist | 475/294 |
| 2,479,654 | 8/1949 | Warburton | 475/326 X |
| 4,583,427 | 4/1986 | Blattman | 475/294 X |
| 4,955,627 | 9/1990 | Hartmann | 475/297 X |
| 5,141,476 | 8/1992 | Chang | 475/297 |

FOREIGN PATENT DOCUMENTS

| | | |
|---|---|---|
| 85202575 | 4/1986 | China . |
| 90105171.3 | 1/1992 | China . |
| 380113 | 11/1907 | France ................. 475/324 |
| 514238 | 3/1921 | France ................. 475/324 |
| 667655 | 3/1952 | United Kingdom ........ 475/324 |

OTHER PUBLICATIONS

"Cranial Exam", Ron Ige, Mountain Bike Magazine, p. 110 Sep. 1996.

Primary Examiner—Khoi Q. Ta
Attorney, Agent, or Firm—Beveridge, DeGrandi, Weilacher & Young, L.L.P.

[57] ABSTRACT

A two directional multi-speed shifting sear of middle axle is made of outer ring, bearings ring, starwheel, freewheel screw cup, freewheel plate, core teeth, inner and outer pawls, and chainwheel etc. The chainwheel is fixed on the outer ring through thread or thread hole. The starwheel is geared with inner teeth of the outer ring and the core teeth. The outer pawl is mounted on pawl hub, the later is fixed on the bottom bracket case of the cycle frame. The middle axle is passed through and fixed with the freewheel plate, the core teeth and the right crank, and then inserted into the bottom bracket case. With such a shifting gear, a pedal cycle may be given a unique function that when the cycle is moving forward, the changing of it's moving speed in the very moving direction may be in-situ realized by variating the shifting gear through pedalling to enable the crank to be rotating in either positive or inversive directions.

5 Claims, 3 Drawing Sheets

TWO DIRECTIONAL MULTI-SPEED SHIFTING GEAR OF MIDDLE AXLE

BACKGROUND OF THE INVENTION

The invention is concerned with a multi-speed shifting gear, and to specific, a two directional two-speed shifting gear of middle axle all kinds of pedal cycles.

It is very common that the middle axle of a typical pedal cycle, such as a bicycle, possesses no function of changing speed. To offer a pedal cycle a speed changing function, normally a speed changing set should be attached to it, for example, a kind of speed changing set made of two to five pieces of chainwheels with different sizes is montaged on the middle axle of a bicycle. As it is known that with this kind of speed changing set, the speed changing of the bicycle may be realized by selectively changing the size of the chainwheel of the driven chain. However with such mechanism, the rotating direction of the middle axle may be restrained only in one direction.

Previously, the inventor of this invention had designed a two-way-driven 2 speed free wheel (Utility model patent No. 8520275, Chinese Patent Office) and a two-way-driven 3 speed free wheel (Invention patent No. 90105171.3, Chinese Patent Office), which are capable of gear-changing as well as motion transmission. Also, both structures can cause a bicycle to go forward whether pedalling in the same direction or backward, and each can be installed on ordinary pedal cycles and fitness bikes as a gear changing mechanism.

The purpose of the invention wherein the article provides a speed shifting gear for the middle axle, which is characterized by having a simple construction, and especially having the possibility of changing speed through pedalling in two directions.

Figure 2:
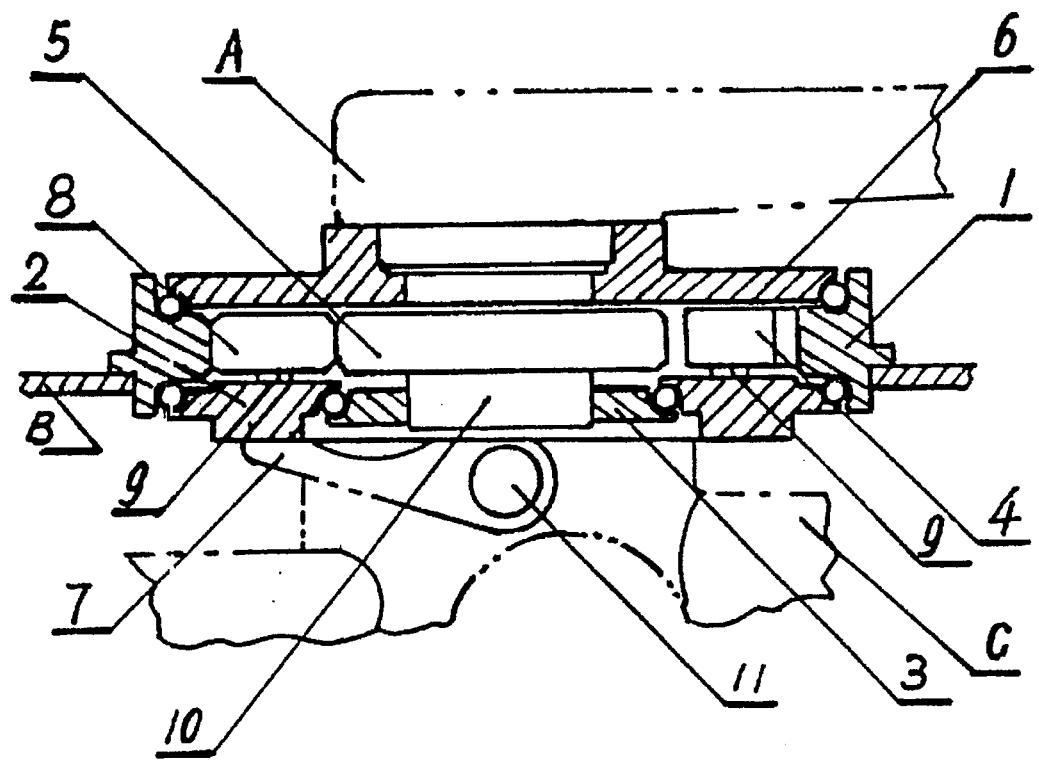
FIG. 2 is a half elevation along the plane 2—2 of the speed shifting gear illustrated in FIG. 1.
Figure 3:
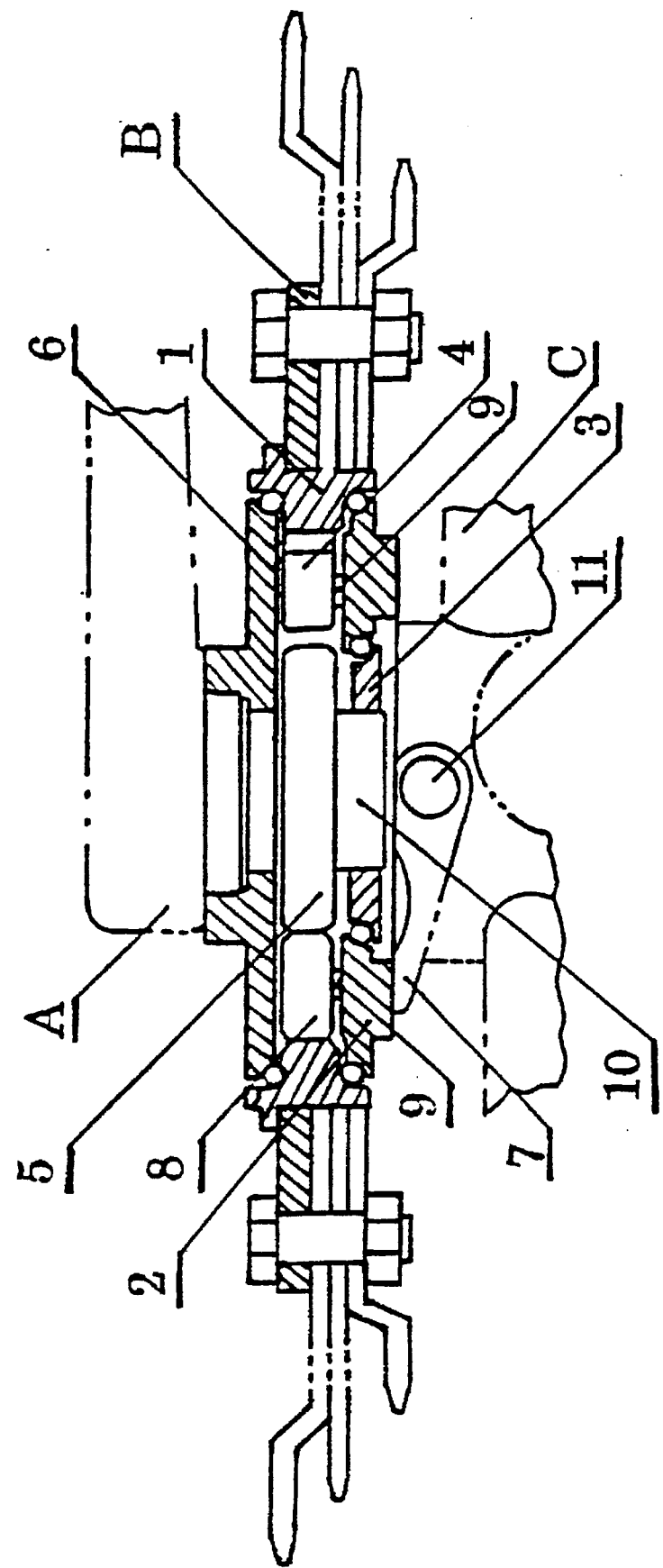

FIG. 3 is the embodiment shown in FIG. 2 having plural chain wheels.

DETAILED DESCRIPTION OF THE INVENTION

The two directional speed shifting gear of middle axle of the invention wherein the article is made of outer ring, bearing ring, starwheel, freewheel screw cup, freewheel plate, core teeth, pawl and chainwheel etc.

The feature of the invention lies in that the inner side of the outer ring 1 has two ball races and inner teeth. On the outer cicumcircle of the outer ring, the chainwheel B is fixed through thread or thread hole on the ring. There is one ball race on each of the inner and the outer circumcircles of the bearing ring 2, and there is pawl teeth mounted on it's outer circumcircle and the small hub 9 on the inner. The inner pawl 4 and the starwheel 8 are separately fixed on the small hubs 9; On the inner circumcircle of the bearing ring 2, two or more pieces of small hubs 9 may be fixed, and on the small hubs 9 one or more pieces of the inner pawls 4 and starwheel are 8 installed. The middle axle 10 passes through the freewheel plate 6, the core teeth 5 and the freewheel screw cup 3 and then connects to the right crank A, e.g. these five parts are fixed with each other. Afterwards the middle axle 10 is installed into the bottom bracket case C on the cycle frame such that the right crank A is located on the right, and outside of the bottom bracket case C. The outer pawl 7 is mounted on a pawl hub, which is fixed on the bottom bracket case C.

Figure 1:
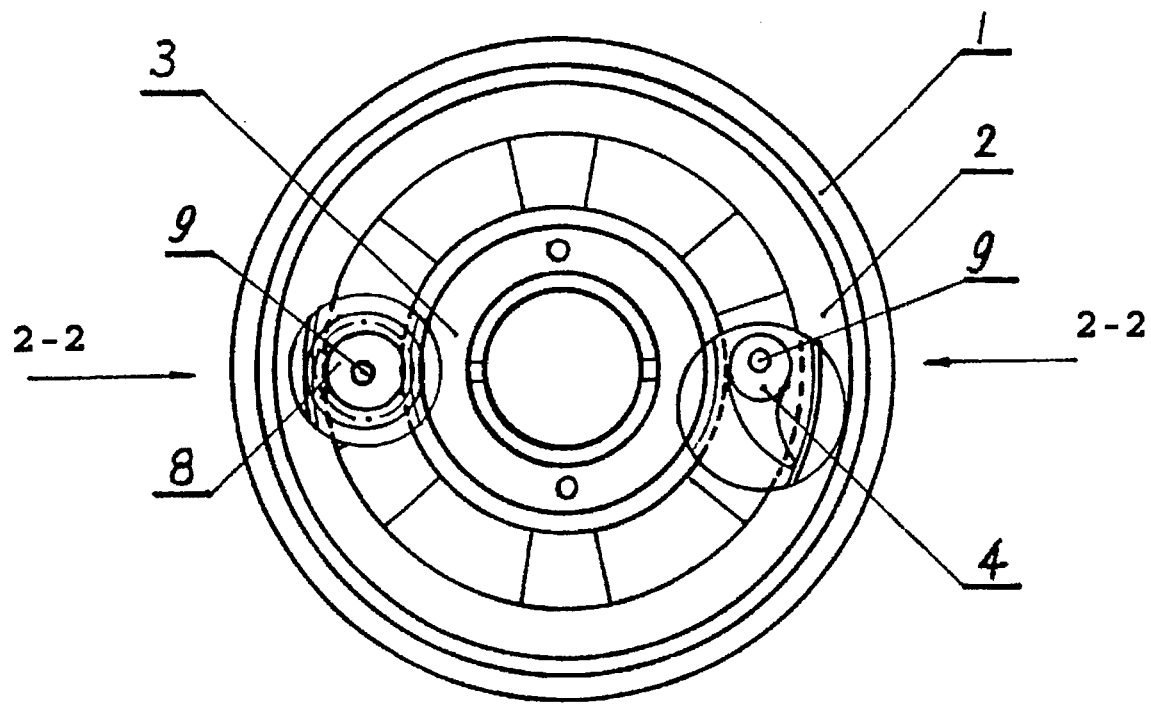
FIG. 1 is the sectional elevation of the speed shifting gear.

FIG. 1 is the sectional elevation of the speed shifting gear and FIG. 2 is a half elevation along the plane 2-2. Wherein: 1 represents outer ring; 2 bearing ring; 3 freewheel screw cup; 4 inner pawl; 5 core teeth; 6 freewheel plate; 7 outer pawl; 8 starwheel; 9 small hub; 10 middle axle; and 11 pawl hub, and A crank of middle axel; B chainwheel of driven chain and C bottom bracket case on the cycle frame.

In accordance with the invention, the speed shifting gear showed in FIG. 1 and FIG. 2 is merely an example of the preferred embodiment of the present invention. In the following, the preferred aspects of the invention will be illustrated in detail, and it should not be taken as limiting of the invention in any respect.

As it is shown in FIG. 1 and FIG. 2, in the two directional speed shifting gears of the middle axle of the present invention, the bearing ring 2 and the freewheel screw cup 3 situate at one side, the freewheel plate 6 situates at the other side thereby supporting the outer ring 1. The starwheel 8 and the inner pawl 4 are mounted between the inner teeth of the outer ring 1 and the core teeth 5. In order to enable the load to be uniformly distributed on the gear body and maintain the construction of the gear, it is preferred that three or more simple pieces of the starwheel 8 and the inner pawl 4, respectively, which are symmetrically engaged on the bearing ring 2 through the small hubs 9. The crank A is fixed on the middle axle 10, while the freewheel plate 6 is mounted on the crank A. The outer pawl 7 is fixed on the bottom bracket case through pawl hub 11 on it. The chainwheel B is fixed on the outer ring 1 through outer thread or thread hole oil the ring.

The operation process of the two directional two-speed shifting gear

1. Ordinary speed running positive wise

Pedalling the crank A to enable the middle axle 10 to rotate clock so that the core teeth 5 which mounted are on the middle axle 10, are synchronously rotating as the axle. Tile core teeth 5 drive the outer ring 1 by transmitting rotational forces through the intermediate wheel, e.g. the starwheel 8. However the outer ring 1 is locked by the inner pawl 4 so that the outer ring 1 may be allowed to rotate only positive clock wise rather than a counter clock wise, e.g., the outer ring 1 will be rotating also synchronously in the same direction, i.e., clockwise, as the core teeth 5. Meanwhile the outer pawl 7 is moving in the same direction as the pawl teeth of the bearing ring 2, and it dose not restrain the rotation of the bearing ring 2. The outer ring 1 may also enable the chainwheel B mounted on the ring 1 to rotate, then the chainwheel B will drive the chain. In such a case, the operation of the middle axle of the speed shifting gear is the same as that of the middle axle of a usual pedal cycle.

2. Low speed running inversive wise

When the middle axle 10 is rotating in the reverse direction, i.e., a counter clockwise direction, the outer pawl 7 will lock the bearing ring 2 so that the bearing ring 2 itself may be allowed to rotate in the positive clock wise but not counter clock wise, therefore, in the same time the starwheel 8 is in a static state. The starwheel 8 now becomes a static intermediate wheel. While following the running of the middle axle, the core teeth 5 will be rotating counter clock wise, which through the starwheel 8 will drive the outer ring rotating as the starwheel in the same way. At this time the inner pawl 4 runs in the same direction, the outer ring 1 will smoothly in the positive clock wise direction, which is, of course, opposed to that of the core teeth. Also the middle axle 10 rotates and drives the chainwheel B, the chain itself moves in the same direction as the outer ring 1. Otherwise when the outer ring 1 is rotating, as the outer diameter of the core teeth 5 is smaller than the inner diameter of the inner hole of the outer ring 1, so the number of the revolution of the outer ring 1 is surely less than that of the core teeth 5, e.g. less than the revolution number of the crank A. This situation is so called the low speed moving.

3. Sliding running

While the crank A being stopped, the core teeth 5 will be in static state, the outer ring 1, driven by the rear hub chainwheel, will rotate in the positive clock wise direction, then the starwheel 8 will be forced running to follow up and so as to drive the bearing ring 2 rotating in the same direction as the outer ring 1 ton. At this time, the outer pawl 7 and the inner pawl 4 are running also positive clock wise direction, which will not restrain the rotation of the bearing ring 2. So that both of the outer ring 1 and the bearing ring 2 will be rotating oppositely against the core teeth 5, so as to realize the sliding running of the chainwheel B.

From the above mentioned, it may be summarized that the present new invented two directional speed shifting gear is proven to possess remarkable advantages prior to the conventional existing products of speed shifting gear. Being simpler in construction, more convenient and more safe and realiable in operation while the chainwheel may be running sliding wise related to the crank, in such case the freewheel fixed on the rear wheel may be replaced by a usual chainwheel, so that to cut down the cost of a pedal cycle, however, offering the same function as before. Besides, on the outer ring 1 of the speed shifting gear, more than two sets of chainwheels can be used therefore the shifting stage of the pedal cycle to be increased efficiently e.g. to insert one chainwheel into the rear freewheel set will result in an increasing of two stage of speed shifting. The installation of such kind of multi-speed shifting gear to a present pedal cycle may surely be realized by means of the conventional technique and tools in today's cycles.

What is claimed is:

1. A two directional multi-speed shifting mechanism for a cycle, comprising:

a bracket case;

an axle;

a free wheel plate fixedly engaged with said axle;

a free wheel screw cup fixedly engaged with said axle;

a core gear having a plurality of teeth defining an outer periphery thereof, said core gear being fixedly engaged with said axle and positioned between said free wheel plate and said free wheel screw cup;

a bearing ring rotatably engaged with said free wheel screw cup, an outer face of said bearing ring defining a plurality of pawl teeth;

an outer ring rotatably engaging said free wheel plate and said bearing ring, said outer ring having a plurality of teeth defining an inner periphery thereof;

a wheel pivotally coupled to an inner face of said bearing ring, said wheel having a plurality of teeth defining an outer periphery thereof, said teeth defined in said wheel engaging said teeth defined in said core gear and said teeth defined in said outer ring;

an inner pawl pivotally coupled to said inner face of said bearing ring, a tip of said inner pawl engaging said teeth defined in said outer ring such that relative movement therebetween is prevented in one direction; and an outer pawl pivotally coupled to said bracket, a tip of said outer pawl engaging said pawl teeth defined in said bearing ring such that relative movement therebetween is prevented in one direction, wherein, said shifting mechanism has a first gearing and a second gearing for rotation of said outer ring in a forward direction, said first gearing is associated with a first speed and is provided by rotating said axle in a first direction and said second gearing is associated with a second speed and is provided by rotating said axle in a direction other than said first direction.

2. The shifting mechanism as defined by claim 1, further comprising:

a crank fixedly engaged with said axle, wherein said shifting gear mechanism switches between said first and said second gearings by changing a rotational direction of said crank.

3. The shifting mechanism as defined by claim 1, wherein:

said wheel and said inner pawl each are pivotally mounted to said inner face of said bearing by means of a hub.

4. The shifting mechanism as defined by claim 1, further comprising:

a first chainwheel fixed to an outer periphery of said outer ring for engaging a cycle chain.

5. The shifting mechanism as defined by claim 4, further comprising:

a second chainwheel fixed to an outer periphery of said outer ring for providing multiple gears for said cycle chain.

* * * * *